(12) United States Patent
Meese et al.

(10) Patent No.: US 8,696,898 B2
(45) Date of Patent: Apr. 15, 2014

(54) DEVICE AND PROCESS FOR IMPROVING MIXING IN THE UV DISINFECTION OF LIQUIDS

(75) Inventors: Wolf-Dietrich Meese, Enger (DE); Geoff Jones-Prichard, Albany (NZ)

(73) Assignee: XYLEM IP Holdings LLC, White Plains, NY (US)

( * ) Notice: Subject to any disclaimer, the term of this patent is extended or adjusted under 35 U.S.C. 154(b) by 527 days.

(21) Appl. No.: 12/513,438

(22) PCT Filed: Jul. 12, 2007

(86) PCT No.: PCT/EP2007/006198
§ 371 (c)(1),
(2), (4) Date: Dec. 4, 2009

(87) PCT Pub. No.: WO2008/055552
PCT Pub. Date: May 15, 2008

(65) Prior Publication Data
US 2010/0089839 A1    Apr. 15, 2010

(30) Foreign Application Priority Data

Nov. 8, 2006  (DE) .......................... 10 2006 052 922

(51) Int. Cl.
*C02F 1/32* (2006.01)

(52) U.S. Cl.
USPC ................... 210/143; 210/198.1; 210/748.01; 210/748.1; 210/153; 422/186.3; 422/24; 422/186.07; 250/437; 250/438; 250/436

(58) Field of Classification Search
USPC ......... 210/748.01, 748.1, 192, 205, 218, 764, 210/760; 422/186.3, 24, 186.7, 186.07; 261/121.1, 115; 250/437, 438, 436
See application file for complete search history.

(56) References Cited

U.S. PATENT DOCUMENTS

| | | | |
|---|---|---|---|
| 5,292,088 A * | 3/1994 | Lemont ........................... | 244/65 |
| 6,015,229 A | 1/2000 | Cormack et al. | |
| 6,402,964 B1 | 6/2002 | Schmid | |
| 6,602,425 B2 * | 8/2003 | Gadgil et al. ................. | 210/744 |
| 6,657,205 B1 * | 12/2003 | Wong ............................. | 250/438 |
| 2002/0023866 A1 * | 2/2002 | Barnes ......................... | 210/192 |
| 2006/0011555 A1 * | 1/2006 | Aulniers ....................... | 210/747 |
| 2006/0049116 A1 * | 3/2006 | Subramanian ................ | 210/748 |
| 2007/0063362 A1 * | 3/2007 | Huhta-Koivisto et al. . | 261/121.1 |

FOREIGN PATENT DOCUMENTS

| | | |
|---|---|---|
| DE | 909 292 | 4/1954 |
| DE | 2 307 877 | 9/1974 |
| DE | 698 21 253 T2 | 11/2004 |
| EP | 0 317 735 A2 | 9/1988 |
| KR | 2003016875 A  * | 3/2003 |
| WO | WO 98/05595 | 2/1998 |
| WO | WO 99/01381 | 1/1999 |
| WO | WO 02/055438 A2 | 7/2002 |
| WO | WO 2006/102802 A1 | 10/2006 |

* cited by examiner

*Primary Examiner* — Joseph Drodge
*Assistant Examiner* — Cameron J Allen
(74) *Attorney, Agent, or Firm* — RatnerPrestia

(57) ABSTRACT

A device is proposed for the UV disinfection of liquids in an open or closed channel, having an inflow for the liquid to be disinfected, at least one UV irradiator arranged downstream of the inflow in a main flow direction and also having an outflow arranged downstream of the UV irradiator, in which a mixing device, driven by an electric motor, is arranged between the inflow and the at least one UV irradiator, which mixing device is set up for generating a cross-flow having at least one velocity component transverse to the main flow direction in order to improve mixing of the liquid.

26 Claims, 7 Drawing Sheets

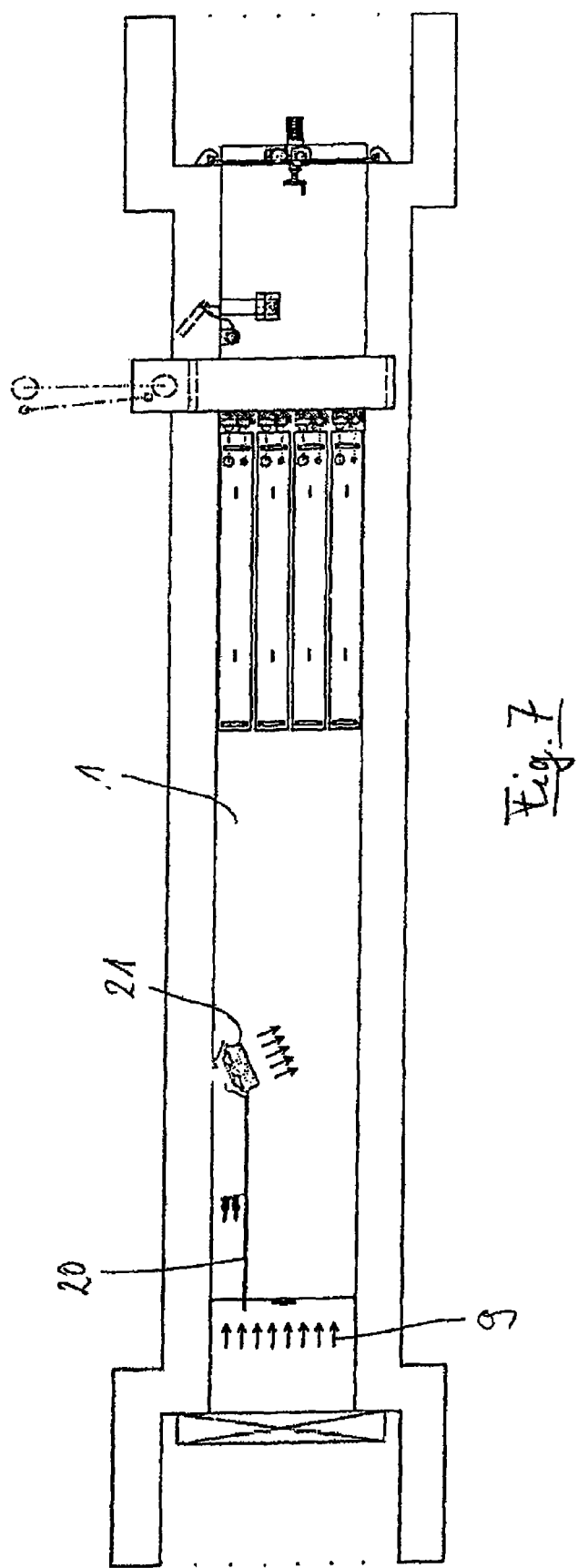

DEVICE AND PROCESS FOR IMPROVING MIXING IN THE UV DISINFECTION OF LIQUIDS

CROSS REFERENCE TO RELATED APPLICATIONS

Figure 1:
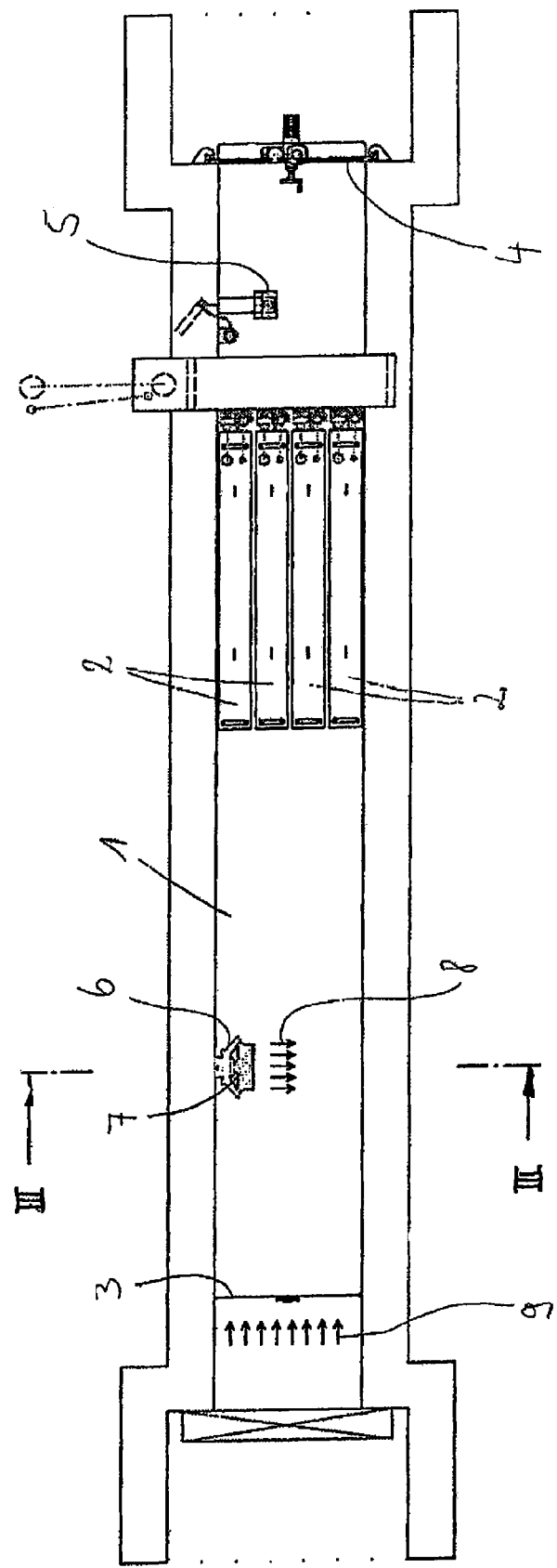

This application is the U.S. national phase application of PCT International Application No. PCT/EP2007/006198, filed Jul. 12, 2007, which claims priority to German Patent Application No. DE102006052922.7, filed Nov. 8, 2006, the content of such applications being incorporated by reference herein.

FIELD OF THE INVENTION

The present invention relates to a device for the UV disinfection of liquids and to a process for the UV disinfection of liquids.

BACKGROUND OF THE INVENTION

The disinfection of liquids, in particular of drinking water or waste water with UV radiation, has been known for a long time. For this purpose the liquid, to be disinfected, is ducted in an open or closed channel. For effective disinfection it is essential that each volume element of the liquid flow receives a certain minimum dosage of UV radiation. Since on the other hand the energy consumption of UV disinfection equipment is an important criterion for the particular operating efficiency, radiation power which is not excessively high is to be used. It is therefore crucial that the liquid flow is so well mixed that each volume element receives the same radiation dosage and no flow paths, in which the radiation dosage is too little, are created.

Various solutions for this are known from the prior art. On the one hand there is disinfection equipment, wherein longitudinally extending UV irradiators are arranged lengthwise in the channel in the flow direction, so that the liquid flow is parallel to the longitudinal axis of the irradiators. In the case of this configuration a uniform spread of the irradiators over the cross section is to be maintained. In addition baffle plates which are located in front of the irradiators or on the irradiators are fitted in the free cross section of the device. These baffle plates create a turbulent current, which diverts volume elements from the centre of the free flow cross section and brings them into proximity of the surface of the irradiators.

Also, disinfection equipment, in which the longitudinal axis of the irradiators is arranged transverse to the flow direction, is known. In the case of this equipment the irradiators themselves create a turbulent current. The individual volume elements of the liquid to be treated are forced through the gap developing between two adjacent irradiators and behind it flow into a wider free cross section up to the next row of UV irradiators. This change in cross section already causes thorough mixing.

Finally, it is known, in front of the disinfection devices, to position a weir or barrage over which the water to be treated must flow. A large turbulence, which should guarantee good mixing of the liquid to be treated, is also created here.

All devices of the type specified above are passive, that is to say, they use the genetic energy of the flowing liquid to create the turbulence. This inevitably leads to an increase in the dynamic resistance or dynamic pressure, which builds up in front of the disinfection device. This is particularly disadvantageous where the liquid to be treated flows purely due to the downward gradient in an existing environment. This is regularly the case particularly with sewage treatment works, in which only a limited downward gradient between an inflow and an outflow is present. If this downward gradient is not sufficient, it becomes necessary to circulate the waste water to be treated by pumps. This is costly.

SUMMARY OF THE INVENTION

Described herein is a device and a process for better mixing of liquids for UV disinfection wherein, compared to a channel without additional devices to create turbulence, only an insignificant increase in dynamic pressure or no increase at all occurs.

Because a mixing device, driven by an electric motor, is arranged between the inflow and at least one UV irradiator, which mixing device is set up for generating a cross-flow having at least one velocity component transverse to the main flow direction, mixing of the liquid is improved directly before the UV disinfection.

If the mixing device has a propeller with an axis of rotation, which is aligned at an angle (a) of 90° to the main flow direction, thorough mixing can be achieved substantially without any influence of the hydrodynamic resistance in the channel. Liquid is sucked off and mixed also from the wall region of the channel if the mixing device has a suction side and a pressure side and the distance between the suction side and a wall of the channel is less than the distance between the pressure side and a wall of the channel.

Particularly good efficiency results if the mixing device has a propeller and a nozzle ring surrounding the propeller. This is further improved if the mixing device on the suction side is connected to a partial current separated by means of a partition because the flow between the suction side and pressure side is prevented from short-circuiting.

Particularly uniform mixing in the channel is achieved if two mixing devices are arranged on opposite sides of the channel. For influencing the hydrodynamic resistance of the channel the at least one mixing device can be aligned at an angle deviating by 90° to the main flow direction.

Only occasional operation of the mixing device, without disturbing the flow through the channel, is possible if the mixing device is arranged in a branch channel, diverted from the channel, for generating a partial current, wherein the branch channel, upstream of the UV irradiator, flows out again into the channel and the partial current is brought into the channel at an angle to the main flow direction. The branch channel can be cut-off by gates or valves whenever the mixing device is out of operation. In particular it is advantageous if the mixing device is arranged outside the free cross section of the channel.

In the case of a process according to the invention for the disinfection of liquids, with the steps a) introduction of a volume flow of the liquid into a channel having a main flow direction, b) generation of a velocity component transverse to the main flow direction by means of a mixing device, which is driven by an electric motor, and c) irradiation of the volume flow with UV radiation, a high degree of disinfection in relation to the radiation power consumed is achieved. If the mixing device is arranged in a separate partial current and the velocity component results by bringing the partial current into the remaining current at an angle, the mixing device can be switched on and off as necessary.

BRIEF DESCRIPTION OF THE DRAWING FIGURES

Figure 2:
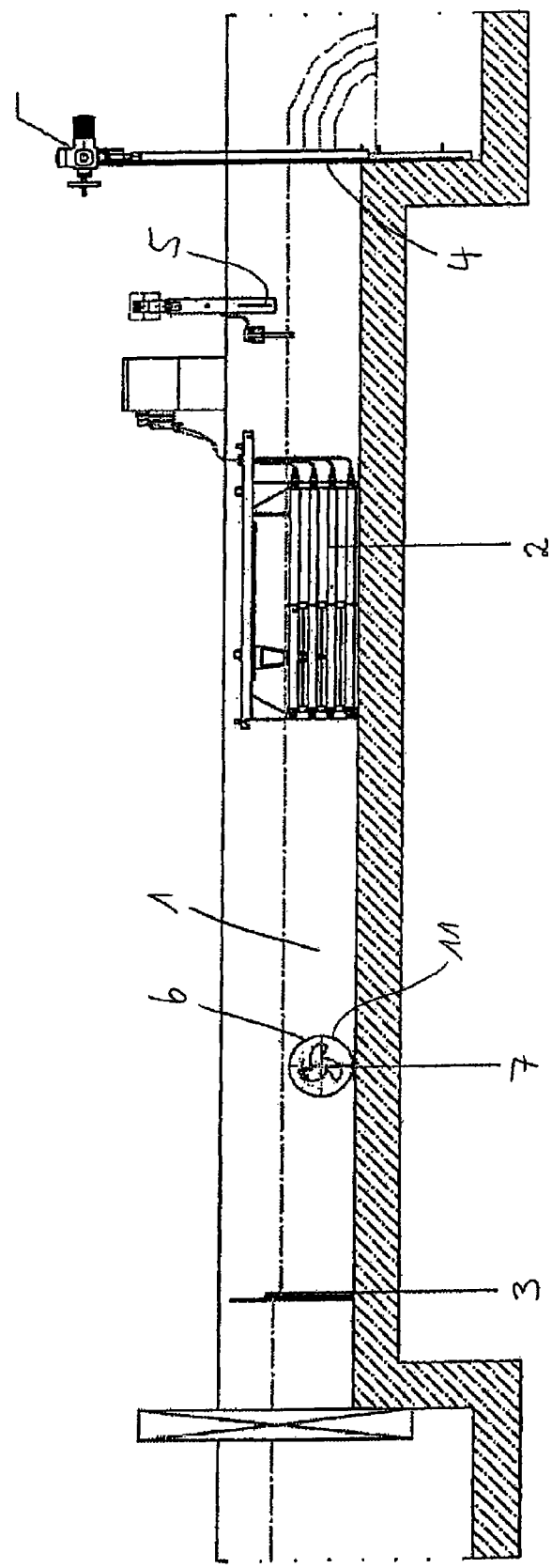
Figure 3:
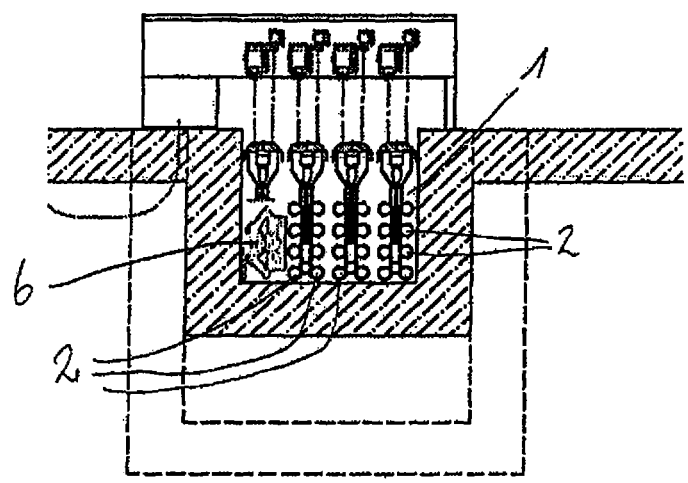
Figure 4:
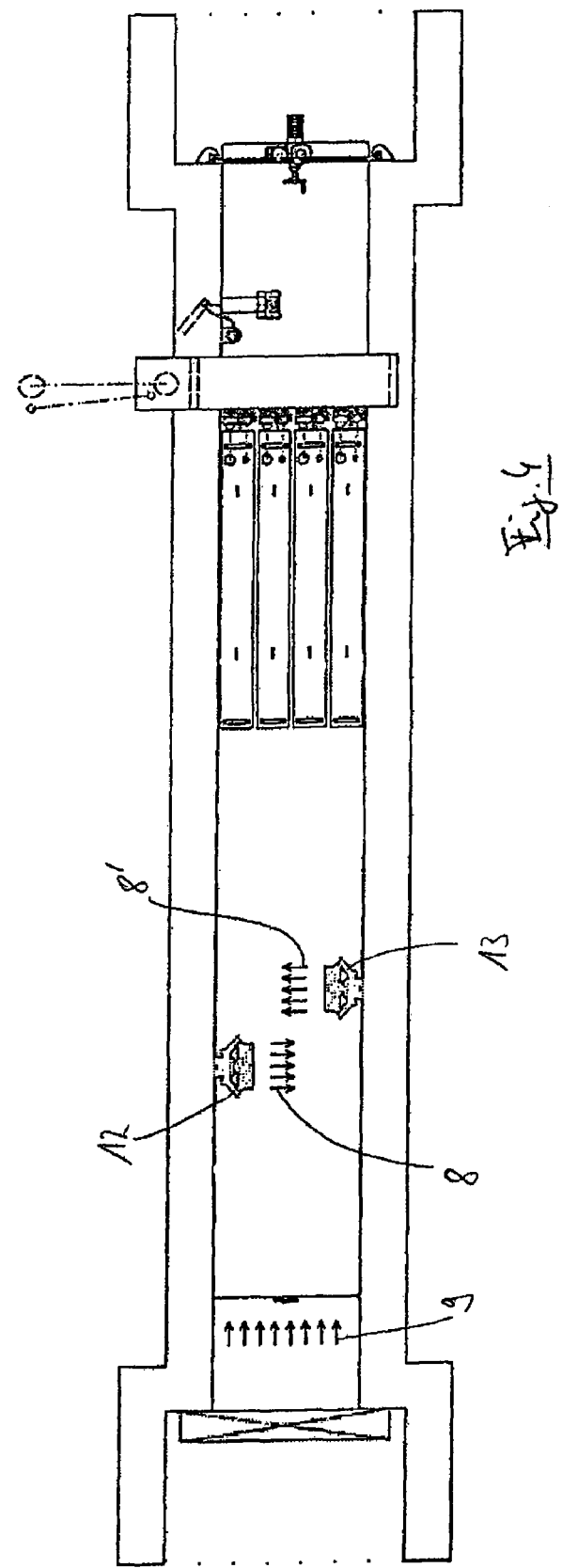
Figure 5:
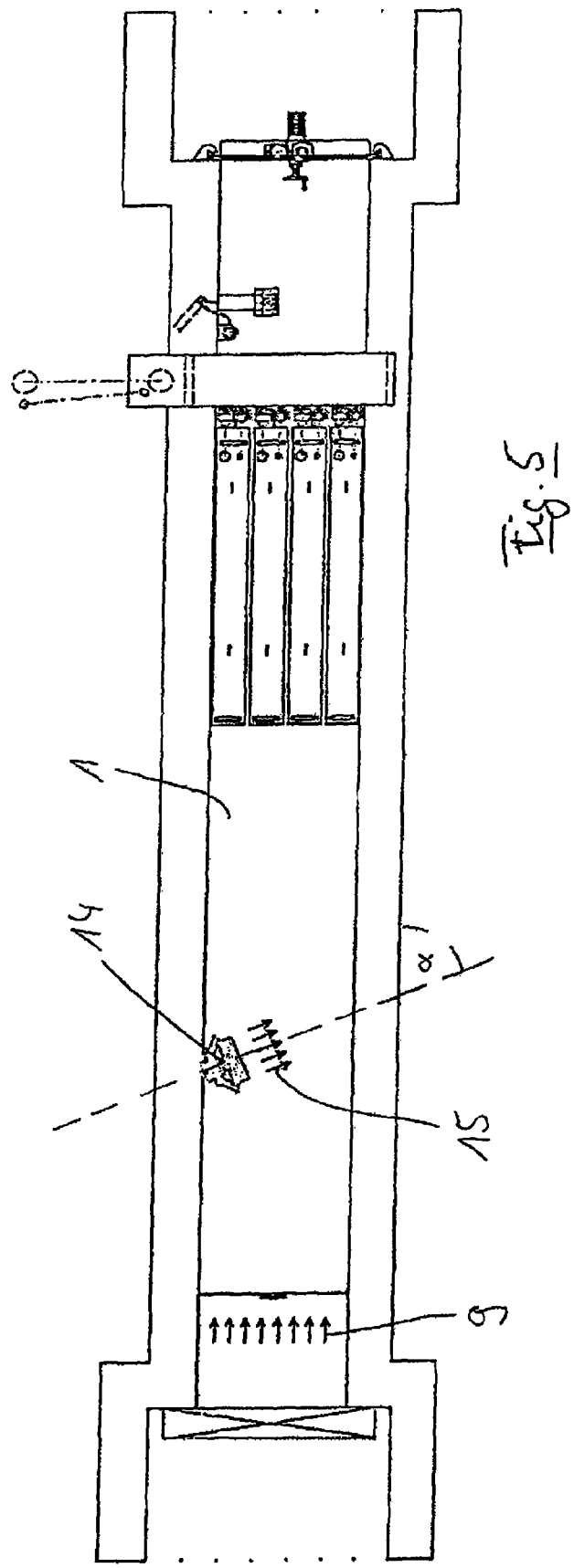
Figure 6:
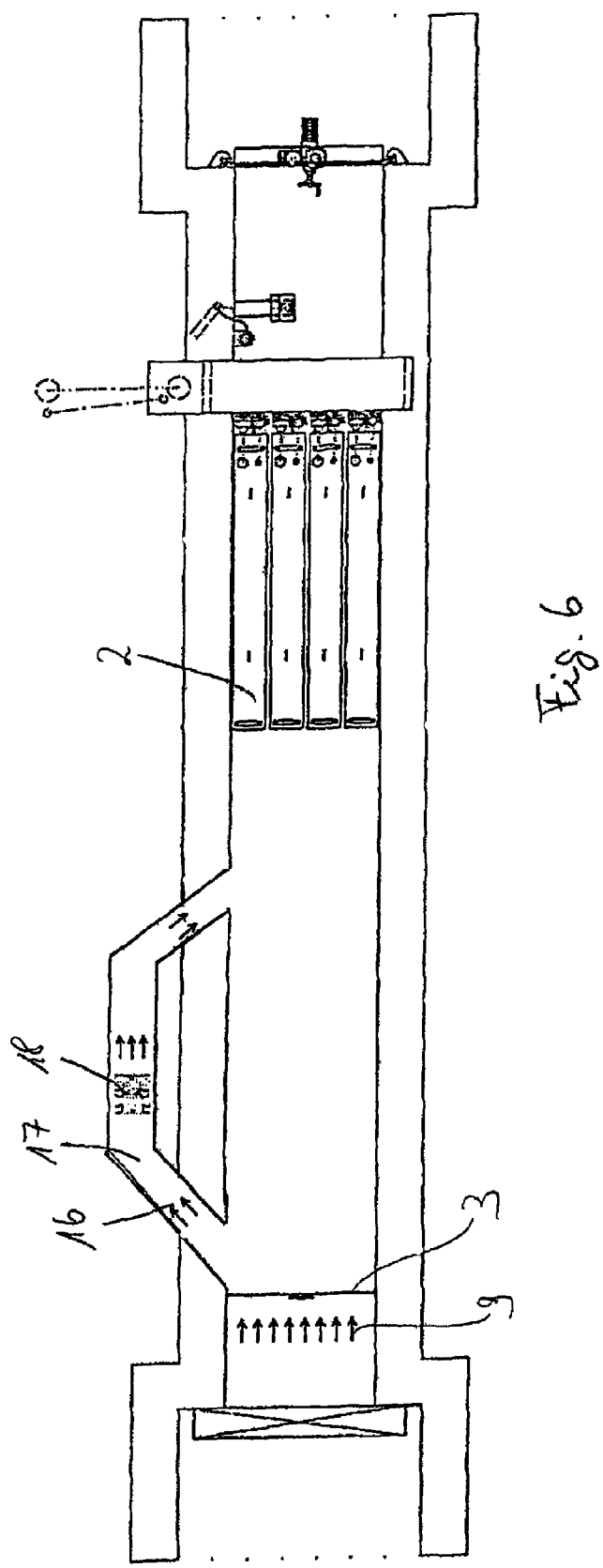

Exemplary embodiments of the invention are described below on the basis of the drawing, wherein there are shown:

FIG. 1: An open channel of a UV disinfection device in a plan view;

FIG. 2: The channel of FIG. 1 in a cross section from the side;

FIG. 3: The channel in accordance with FIG. 1 and FIG. 2 in a cross section along line III of FIG. 1;

FIG. 4: A channel according to FIG. 1 with two mixing devices;

FIG. 5: A channel according to FIG. 1 with a mixing device having a gradient;

FIG. 6: A channel according to FIG. 1 with a mixing device in a branch channel; and FIG. 7: A device with a partial current separated by a partition.

DETAILED DESCRIPTION OF THE INVENTION

FIG. 1 shows a UV disinfection device for the outflow of a sewage treatment works in a plan view. The disinfection device is designed as an open channel 1, in which a number of UV irradiators 2 are used. The UV irradiators 2 in this embodiment are implemented as low pressure UV irradiators and with their longitudinal axis are oriented parallel to the flow direction. A first weir 3 and second weir 4 regulate the water level in the channel 1. A sensor 5 monitors the water level.

A mixing device 6 which, designed as an impeller above a propeller 7 driven by an electric motor, generates a current in the direction of the flow arrows 8, is arranged in the region between the first weir 3 and the UV irradiator 2. This current is aligned transverse to the direction of the current illustrated by the flow arrows 9. The flow arrows 9 indicate the flow through the channel 1 purely due to the downward gradient existing in the sewage treatment works. The current in the direction of the arrows 9 is almost laminar.

FIG. 2 shows the channel in accordance with FIG. 1 in a cross section in the main flow direction 9. The same elements are provided with the same reference numbers.

The mixing device 6 apart from the propeller 7 has a nozzle ring 11 concentrically surrounding the propeller 7. This nozzle ring 11 assists in generating the cross-flow 8 during operation. It also ensures that the water is sucked from the direct environment of the side wall, left in the flow direction, of the channel 1 and also that no stationary current arises there.

FIG. 3 shows the arrangement in accordance with FIG. 1 and FIG. 2 in a cross section along line III-III of FIG. 1.

The cross section of the UV irradiators 2, seen in the flow direction, that is to say, in the illustration in accordance with FIG. 3, is round and elongated. A number of UV irradiators (here: 32) are arranged so that they uniformly fill out the free cross section of the channel 1 up to the intended maximum water level. Uniform spread of the UV radiation over the cross section is assisted as a result of this arrangement. However, laminar flow paths, in which the UV dosage is a minimum, can be created directly between the irradiators and in the corner regions of the channel. The mixing device 6 which is arranged in the flow direction before the UV irradiators 2 and generates a cross-flow 8 causes turbulence which during operation prevents individual microorganisms from being able to travel the entire way through the UV irradiators 2 along such a laminar flow path. Thorough mixing by the cross-flow 8 therefore ensures better exposure of the microorganisms to the UV radiation. In this way the UV dosage delivered to each individual volume element of the waste water is almost equal. The irradiation of the individual volume elements is therefore more uniform.

In relation to the original configuration wherein, due to an increase in the radiation power actually delivered, the disinfection of the corner regions and of the unimpeded flow paths with the intended minimum dosage is also guaranteed, the radiation power can be reduced so that the energy consumption is less. In practice the reduction of the radiation power is greater than the driving power for the mixing device 6, so that an economic benefit results. With unchanged radiation power an improvement in disinfection of up to 25% has been observed by using the mixing device 6.

FIG. 4 shows another embodiment of the present invention. In the case of this embodiment two mixing devices 12 and 13, which are arranged at two sequential positions in the main flow direction 9, are provided in total. The mixing device 12 generates a cross-flow 8, which is directed to the right as in FIG. 1. The mixing device 13 generates a cross-flow in the opposite direction, which is referenced with 8. The electrical power, which is consumed to produce the cross-flows 8 and 8', is distributed over the two driving motors of the mixing devices 12 and 13. In comparison to the embodiment in FIG. 1, both mixing devices in each case can have about half the electrical power of the mixing device 6. This configuration is advantageous in many cases of application.

FIG. 5 shows an arrangement according to FIG. 1. With this arrangement a mixing device 14 is arranged at an angle oriented by 90° to the main flow direction 9. Accordingly a current 15 aligned diagonally to the longitudinal axis is generated. The diagonal cross-flow 15 as in FIG. 5 can have a velocity component in the main flow direction 9. The current through the channel 1 is accelerated as a result. Alternatively, the mixing device 14 can also be aligned in the other direction, so that a velocity component is generated against the main flow direction 9. The current through the channel 1 is then slowed down somewhat. A dynamic resistance is formed. However, it is expected that thorough mixing will be more intensive as a result.

According to the embodiment of FIG. 4 two mixing devices can also be arranged on opposite sides of the channel 1 at an inclined angle alpha deviating by 90°. Thorough mixing of the waste water to be treated is further improved thereby.

FIG. 6 shows an embodiment, wherein a partial current 16 is diverted from the waste water to be treated and conveyed in a branch channel 17. In the branch channel 17 sits a propeller 18 which works here as a mixing device and brings the partial current 16, accelerated at an obtuse angle, into the main current in the channel 1. With this embodiment the free cross section in the main flow direction 9 from the first weir 3 to the UV irradiators 2 is not affected by fittings. In the case of this embodiment the propeller 12 can remain out of operation with the branch channel open or closed, without which the operability of the UV disinfection device would otherwise be impaired by fittings in the channel 1 obstructing the current. This embodiment enables the propeller 18 to be operated only when there are special requirements, if particular turbidity or an especially high bacteria count is determined for example.

FIG. 7 finally shows an embodiment with a partition 20 inside the channel 1, which likewise diverts a partial current and directs this to a mixing device 21. In the case of this embodiment, hydraulic short-circuiting between the suction side and the pressure side of the mixing device 21 is impossible. This embodiment is in particular energy-saving.

The invention claimed is:

1. Device for the UV disinfection of liquids in an open or closed channel, having an inflow for the liquid to be disinfected, at least one UV irradiator arranged downstream of the inflow in a main flow direction and also having an outflow arranged downstream of the UV irradiator, wherein a mixing device, driven by an electric motor, is arranged between the inflow and the at least one UV irradiator, which mixing device is set up for generating a cross-flow having at least one velocity component transverse to the main flow direction, wherein longitudinal axes of the inflow, the outflow and an entirety of the channel, which is defined between the inflow and the outflow, are substantially aligned, and wherein the entirety of the channel is straight and continuous.

2. Device according to claim 1, wherein the mixing device has a propeller having an axis of rotation, which is aligned at an angle (a) of 90° to the main flow direction.

3. Device according to claim 1, wherein the mixing device has a suction side and a pressure side, and in that the distance between the suction side and a wall of the channel is less than the distance between the pressure side and a wall of the channel.

4. Device according to claim 1, wherein the mixing device has a propeller and a nozzle ring surrounding the propeller.

5. Device according to claim 1, wherein two mixing devices are arranged on sides, lying opposite one another, of the channel.

6. Device according to claim 1, wherein the at least one mixing device is aligned at an angle deviating by 90° to the main flow direction.

7. Device according to claim 1, wherein the mixing device is connected, on the suction side, to a partial current separated by means of a partition.

8. Device according to claim 1, wherein the mixing device is arranged in a branch channel, diverted from the channel, for generating a partial current, wherein the branch channel, upstream of the UV irradiator, flows out again into the channel and the partial current is brought into the channel at an angle to the main flow direction.

9. Device according to claim 8, wherein the mixing device is arranged outside the free cross section of the channel.

10. Process for the disinfection of liquids using the device of claim 1, with the steps:
   introduction of a volume flow of the liquid into a channel having a main flow direction,
   generation of a velocity component transverse to the main flow direction by means of the mixing device which is driven by the electric motor,
   irradiation of the volume flow with UV radiation.

11. Process according to claim 10, wherein the mixing device is arranged in a separate partial current, and in that the velocity component results by bringing the partial current into the remaining current at an angle.

12. Device according to claim 1 further comprising a liquid level sensor that is positioned at the same elevation as the mixing device.

13. Device according to claim 1 wherein the velocity component of the cross-flow is oriented in a downward direction.

14. Device according to claim 1, wherein a cross-section of the channel located between the inflow and the outflow is substantially constant.

15. Device for the UV disinfection of liquids in an open or closed channel, having an inflow for the liquid to be disinfected, at least one UV irradiator arranged downstream of the inflow in a main flow direction and also having an outflow arranged downstream of the UV irradiator, wherein a mixing device, driven by an electric motor, is arranged between the inflow and the at least one UV irradiator, which mixing device is set up for generating a cross-flow having at least one velocity component transverse to the main flow direction, wherein longitudinal axes of the inflow, the outflow and an entirety of the channel, which is defined between the inflow and the outflow, are substantially aligned, and wherein a cross-section of the channel located between the inflow and the outflow is substantially constant.

16. Device according to claim 15, wherein the mixing device has a propeller having an axis of rotation, which is aligned at an angle (a) of 90° to the main flow direction.

17. Device according to claim 15, wherein the mixing device has a suction side and a pressure side, and in that the distance between the suction side and a wall of the channel is less than the distance between the pressure side and a wall of the channel.

18. Device according to claim 15, wherein the mixing device has a propeller and a nozzle ring surrounding the propeller.

19. Device according to claim 15, wherein two mixing devices are arranged on sides, lying opposite one another, of the channel.

20. Device according to claim 15, wherein the at least one mixing device is aligned at an angle deviating by 90° to the main flow direction.

21. Device according to claim 15, wherein the mixing device is connected, on the suction side, to a partial current separated by means of a partition.

22. Device according to claim 15, wherein the mixing device is arranged in a branch channel, diverted from the channel, for generating a partial current, wherein the branch channel, upstream of the UV irradiator, flows out again into the channel and the partial current is brought into the channel at an angle to the main flow direction.

23. Device according to claim 15, wherein the mixing device is arranged outside the free cross section of the channel.

24. Device according to claim 15 further comprising a liquid level sensor that is positioned at the same elevation as the mixing device.

25. Process for the disinfection of liquids using the device of claim 15, with the steps:
   introduction of a volume flow of the liquid into a channel having a main flow direction,
   generation of a velocity component transverse to the main flow direction by means of the mixing device which is driven by the electric motor,
   irradiation of the volume flow with UV radiation.

26. Process according to claim 25, wherein the mixing device is arranged in a separate partial current, and in that the velocity component results by bringing the partial current into the remaining current at an angle.

* * * * *

UNITED STATES PATENT AND TRADEMARK OFFICE
CERTIFICATE OF CORRECTION

PATENT NO.        : 8,696,898 B2                               Page 1 of 1
APPLICATION NO.   : 12/513438
DATED             : April 15, 2014
INVENTOR(S)       : Meese et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 873 days.

Signed and Sealed this

Twenty-ninth Day of September, 2015

Michelle K. Lee
*Director of the United States Patent and Trademark Office*